United States Patent
Liao

(10) Patent No.: US 9,128,658 B2
(45) Date of Patent: Sep. 8, 2015

(54) DATA TRANSMISSION SYSTEMS, DATA TRANSMISSION METHOD AND DATA RECEPTION METHOD

(71) Applicant: Wistron Corp., New Taipei (TW)

(72) Inventor: Wen-Te Liao, New Taipei (TW)

(73) Assignee: WISTRON CORP., New Taipei (TW)

( * ) Notice: Subject to any disclaimer, the term of this patent is extended or adjusted under 35 U.S.C. 154(b) by 302 days.

(21) Appl. No.: 13/693,787

(22) Filed: Dec. 4, 2012

(65) Prior Publication Data

US 2013/0297834 A1 Nov. 7, 2013

(30) Foreign Application Priority Data

May 4, 2012 (TW) .............................. 101115923 A

(51) Int. Cl.
*G06F 3/00* (2006.01)
*H04N 7/12* (2006.01)
*G06F 3/14* (2006.01)
*G06F 13/38* (2006.01)

(52) U.S. Cl.
CPC . *G06F 3/14* (2013.01); *G06F 13/38* (2013.01)

(58) Field of Classification Search
CPC ............................... G06F 4/0643; G06F 15/16
USPC ............................................. 710/7; 709/231
See application file for complete search history.

(56) References Cited

U.S. PATENT DOCUMENTS

| 7,295,550 B2 | 11/2007 | Shimba et al. |
| 2006/0067123 A1 | 3/2006 | Jigour et al. |
| 2008/0005434 A1 | 1/2008 | Lee et al. |
| 2010/0067571 A1* | 3/2010 | White et al. ............. 375/240.01 |

FOREIGN PATENT DOCUMENTS

| TW | 200402961 | 2/2004 |
| TW | 201112683 | 4/2011 |

OTHER PUBLICATIONS

Taiwanese language office action dated Aug. 22, 2014.
Translation of relevant paragraphs of Taiwanese office action.
Taiwanese language office action dated Apr. 14, 2014.
English language translation of relevant paragraphs of Taiwanese office action.
English language translation of relevant paragraphs of TW 201112683 (published Apr. 1, 2011).

* cited by examiner

*Primary Examiner* — Titus Wong
(74) *Attorney, Agent, or Firm* — McClure, Qualey & Rodack, LLP

(57) ABSTRACT

The present invention discloses a data transmission system. The data transmission system includes a processing unit, a first serial peripheral interface circuit, and a first display interface circuit. The processing unit is arranged to determine a length of a file, divide the file into at least one sub-file according to a system resolution, and produce a file transfer command. The first serial peripheral interface circuit is arranged to transmit the file transfer command to a second serial peripheral interface circuit. The first display interface circuit is arranged to transmit the at least one sub-file to a second display interface circuit, sequentially.

19 Claims, 4 Drawing Sheets

DATA TRANSMISSION SYSTEMS, DATA TRANSMISSION METHOD AND DATA RECEPTION METHOD

CROSS REFERENCE TO RELATED APPLICATIONS

This Application claims priority of Taiwan Patent Application No. 101115923, filed on May 4, 2012, the entirety of which is incorporated by reference herein.

BACKGROUND OF THE INVENTION

1. Field of the Invention

The present invention relates to a data transmission system, and in particular, relates to a data transmission system having a display interface circuit used for updating software.

2. Description of the Related Art

Intelligent electronic devices, such as televisions, refrigerators, air-conditioners, video games, etc. in home networks include various microprocessors. All of these electronic devices need to load or update software to perform various arithmetic logic counting processes and functions. Generally, software is already loaded into the intelligent electronic devices before being sold to users. However, a user may need to update the software due to different usages or versions. When the speed of updating software is not fast enough, it may be inconvenient for users. Therefore, there is a need for a method or device to speed up the software updating process.

BRIEF SUMMARY OF THE INVENTION

A detailed description is given in the following embodiments with reference to the accompanying drawings.

One aspect of the present invention provides a data transmission system. The data transmission system includes a processing unit, a first serial peripheral interface circuit, and a first display interface circuit. The processing unit is arranged to determine a length of a file, divide the file into at least one sub-file according to a system resolution, and produce a file transfer command. The first serial peripheral interface circuit is arranged to transmit the file transfer command to a second serial peripheral interface circuit. The first display interface circuit is arranged to transmit the at least one sub-file to a second display interface circuit, sequentially.

Besides, another aspect of the present invention provides a data transmission method. The data transmission method includes determining a length of a file when receiving a first system command, and producing a file transfer command according to the length and usage of the file; dividing the file into at least one sub-file according to a system resolution, and transmitting the at least one sub-file to a buffer; transmitting the file transfer command to a second serial peripheral interface circuit by a first serial peripheral interface circuit; and transmitting the at least one sub-file to a second display interface circuit by a first display interface circuit in parallel transmission, sequentially.

Furthermore, another aspect of the present invention provides a data reception method. The data reception method includes determining whether a first serial peripheral interface circuit has received a file transfer command or a display command, wherein the file transfer command includes a first identify data and a second identify data, wherein the first identify data is arranged to indicate usage of a file, and the second identify data is arranged to indicate a length of the file; receiving at least one sub-file by a first display interface circuit in parallel transmission, sequentially, when receiving the file transfer command; and combining the at least one sub-file with each other to constitute the file according to the file transfer command.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
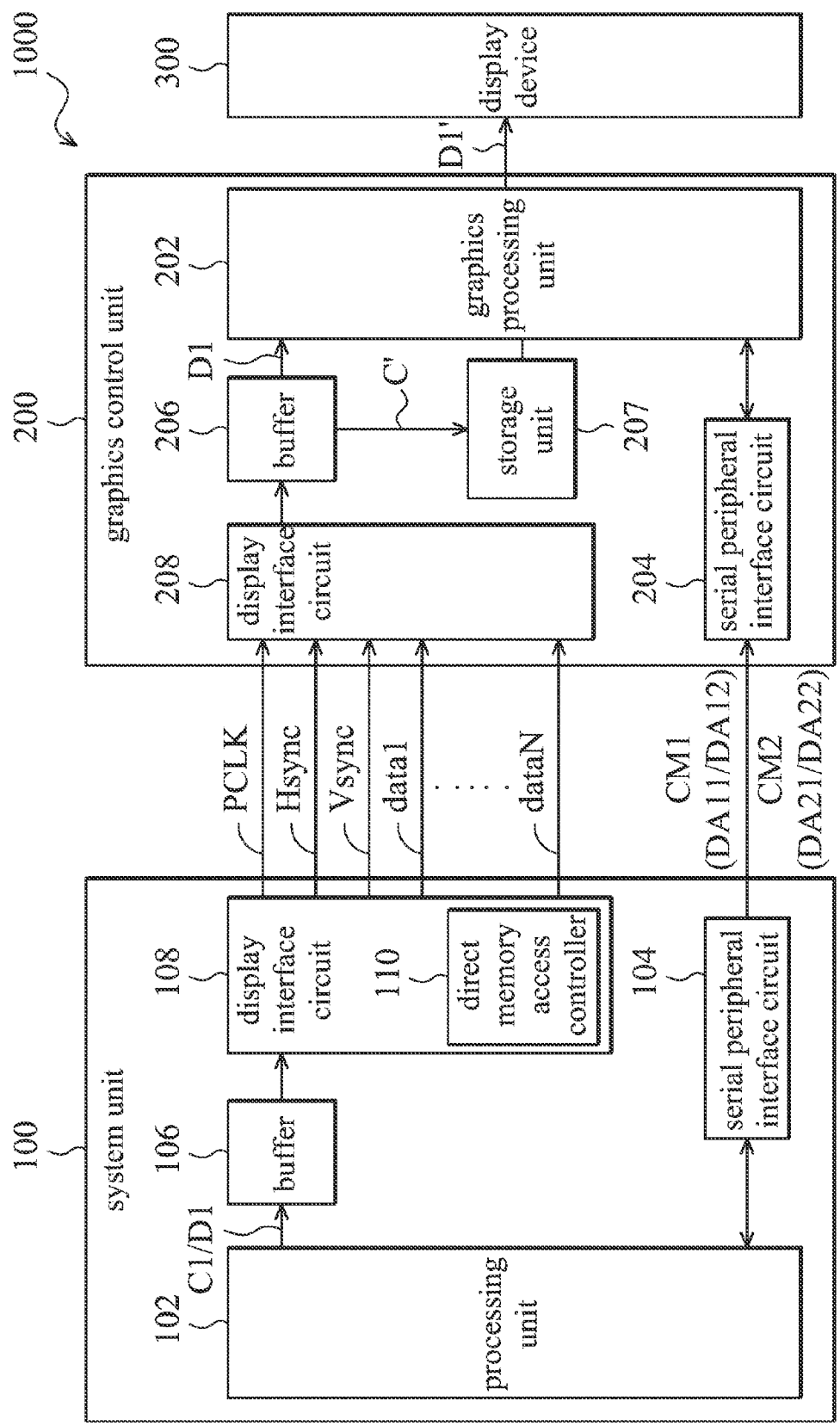
FIG. 1 is a schematic diagram illustrating an embodiment of a data transmission system according to the exemplary embodiments.

FIG. 1 is a schematic diagram illustrating an embodiment of a data transmission system of the exemplary embodiments. The data transmission system 1000 includes a system unit 100, a graphics control unit 200, and a display device 300. The data transmission system 1000 can be a desktop computer, a notebook computer, a server or other electronic devices, but it is not limited thereto.

The system unit 100 includes a processing unit 102, a serial peripheral interface circuit 104, a buffer 106, and a display interface circuit 108, but it is not limited thereto. The processing unit 102 can be a central processing unit, but it is not limited thereto. In one of the exemplary embodiments, the processing unit 102, the serial peripheral interface circuit 104, the buffer 106, and the display interface circuit 108 can be implemented in a chip. In another embodiment, the processing unit 102, the serial peripheral interface circuit 104, the buffer 106, and the display interface circuit 108 can be implemented in a plurality of individual circuits, respectively. Moreover, the system unit 100 can further include a storage device, an oscillator, and a power management circuit (not shown), etc., which are arranged to execute the operations of the data transmission system 1000. The processing unit 102 is arranged to receive the system commands and execute calculations according to the system commands. For example, the processing unit 102 is arranged to determine the length of the file C1 when the received system command indicates updating the software of the graphics control unit 200, wherein the received system command is the first system command. Moreover, the processing unit 102 is further arranged to divide the file C1 into at least one sub-file (not shown) according to a system resolution and produce a file transfer command CM1, accordingly, wherein the processing unit 102 is further arranged to transmit the at least one sub-file divided from the file C1 to a buffer 106. For example, the processing unit 102 is arranged to divide the file C1 according to the system resolution. Namely, the quantity of the data of each of the at least one sub-file divided from the file C1 by the processing unit 102 is equal to the quantity of the system resolution. Namely, the quantity of the data of each of the at least one sub-file is equal to the quantity a frame having the system resolution. Moreover, the file transfer command CM1 includes the identify data DA11 and the identify data DA12. The identify data DA11 is arranged to indicate the usage (application) of the file C1, and the identify data DA12 is arranged to indicate the length of the file C1. The serial peripheral interface circuit 104 is arranged to transmit the file transfer command CM1 of the processing unit 102 to the serial peripheral interface circuit 204 of the graphics control unit 200. The display interface circuit 108 includes a direct memory access controller 109 (DMA controller), at least 16 data lines data1-dataN, a horizontal sync signal line Hsync, a vertical sync signal line Vsync, and a clock line PCLK. In another embodiment, the number of the data lines data1-dataN can be 24. The direct memory access controller 109 is arranged to force the data lines data1-dataN to transmit the at least one sub-file to the display interface circuit 208 in parallel transmission after being enabled by the processing unit 102, sequentially. Furthermore, the direct memory access controller 109 is further arranged to force the horizontal sync signal line Hsync and the vertical sync signal line Vsync to transmit a horizontal sync signal and a vertical sync signal corresponding to the at least one sub-file to the graphics control unit 200 to the graphics control unit 200. For example, the display interface circuit 108 can transmit 16 bits of one sub-file by the 16 data lines, simultaneously, to the graphics control unit 200. Namely, the display interface circuit 108 can transmit 16 bits of a sub-file in parallel transmission, simultaneously, to the graphics control unit 200. For another example, the display interface circuit 108 can transmit 24 bits of one sub-file by the 24 data lines, simultaneously, to the graphics control unit 200. Namely, the display interface circuit 108 can transmit 24 bits of a sub-file in parallel transmission, simultaneously, to the graphics control unit 200.

In this embodiment, the file C1 is a program code stored in the storage device of the data transmission system 1000. In another embodiment, the file C1 is a program code stored in a remote server (not shown), but it is not limited thereto. In another embodiment, the file C1 can be data, and the transfer command CM1 can be arranged to store the data into the graphics control unit 200, but it is not limited thereto. It should be noted that the system resolution stored in the system unit 100 is the resolution corresponding to the current frame displayed by the display device 300. Furthermore, the transmission and the quantity of each of the at least one sub-file correspond to a frame having the system resolution. For example, the length of the file C1 is 80000 bits, the resolution of the current frame displayed by the display device 300 is 320*240, and each of pixels has 8-bit colour. In this embodiment, the length of the frame having the system resolution is 76800 bits (320*240*8/8). Therefore, the processing unit 102 divides the file C1, which has 80000 bits, into two sub-files, and produces the file transfer command CM1, accordingly. The first sub-file of the two sub-files has 76800 bits of valid data, the second sub-file of the two sub-files has 3200 bits of valid data and 72600 bits of invalid data. The identify data DA11 of the file transfer command CM1 is arranged to indicate that the file C1 is used for updating program code, and the identify data DA12 is arranged to indicate the length of the file C1 (80000 bits). For example, the identify data DA11 of the file transfer command CM1 is a code arranged to indicate that the file C1 is used for updating the program code, and the identify data DA12 is a code arranged to indicate the length of the file C1 (80000 bits). For example, the code of identify data of the exemplary embodiments can be 0X70 and/or 0XNNNNNNNN, etc., but it is not limited thereto.

In another embodiment, the processing unit 102 is arranged to transmit an image data D1 to a buffer 106 when the system command indicates displaying image, wherein the system command, which indicates displaying image, is the second system command. Moreover, the processing unit 102 is further arranged to produce a display command CM2 according to a resolution and usage of the image data D1, and force the serial peripheral interface circuit 104 to transmit the display command CM2 to the graphics control unit 200. The display command CM2 includes the identify data DA21 and the identify data DA22. The identify data DA21 is arranged to indicate the usage of the image data D1, and the identify data DA22 is arranged to indicate the resolution of the image data D1. For example, the identify data DA21 of the display command CM2 is a code arranged to indicate that the image data D1 is used for displaying image, the identify data DA22 is a code arranged to indicate the resolution of the image data D1. The processing unit 102 is arranged to enable the direct memory access controller 109 after transmitting the display command CM2 to the graphics control unit 200 by the serial peripheral interface circuit 104. The direct memory access controller 109 is arranged to force the data lines data1-dataN to transmit the image data D1 to the display interface circuit 208 in parallel transmission after being enabled by the processing unit 102, sequentially, and force the horizontal sync signal line Hsync and the vertical sync signal line Vsync to transmit a horizontal sync signal and a vertical sync signal corresponding to the image data D1 to the graphics control unit 200.

The graphics control unit 200 includes a graphics processing unit 202, a serial peripheral interface circuit 204, a buffer 206, a storage unit 207, and a display interface circuit 208, but it is not limited thereto. For example, the graphics control unit 200 can further include an oscillator, and a power management circuit (not shown), etc. The graphics processing unit 202 is arranged to execute calculations according to the file transfer command CM1 or the display command CM2. The serial peripheral interface circuit 204 is arranged to receive the file transfer command CM1 or the display command CM2 transmitted by the system unit 100, and transmit the file transfer command CM1 or the display command CM2 to the graphics processing unit 202. The buffer 206 is arranged to store the at least one sub-file or the image file D1 received by the display interface circuit 208. The storage unit 207 is arranged to store the file C1' combined by the graphics processing unit 202, wherein the file C1' constituted by the at least one sub-file is same as the file C1. It should be noted that the storage unit 207 is a non-volatile memory device, such as a FLASH, EEROM, etc., but it is not limited thereto. The display interface circuit 208 share the data lines data1-dataN, the horizontal sync signal line Hsync, the vertical sync signal line Vsync, and the clock line PCLK with the display interface circuit 108 to receive signals from the display interface circuit 108.

In one of the exemplary embodiments, the graphics processing unit 202 is arranged to force the display interface circuit 208 to receive at least one sub-file, a horizontal sync signal, and a vertical sync signal from the system unit 100 according to the file transfer command CM1 when the serial peripheral interface circuit 204 receives the file transfer command CM1. Furthermore, the graphics processing unit 202 is arranged to determine whether the display interface circuit 208 has received all of the at least one sub-file according to the horizontal sync signal, the vertical sync signal, and the identify data DA12. The graphics processing unit 202 is arranged to combine the received sub-file with the each other to constitute the file C1' according to the file transfer command CM1 when all of the at least one sub-file is received by the display interface circuit 208. For example, the identify data DA11 of the file transfer command CM1 is a code arranged to indicate that the file C1 is used for updating program code, and the identify data DA12 is a code arranged to indicate the length of the file C1 (80000 bits). The graphics processing unit 202 determines that the length of file is 80000 bits according to the identify data DA12, and the graphics processing unit 202 can determine that the number of the at least one sub-file is two, according to the resolution (i.e. 320*240*8) of the current frame displayed by the display device 300 and the identify data DA12. Namely, the graphics processing unit 202 can determine that the number of the at least one sub-file is two according to the system resolution and the identify data DA12. It should be noted that the graphics processing unit 202 is arranged to determine whether the display interface circuit 208 has received all of the at least one sub-file according to the horizontal sync signal, the vertical sync signal, and the identify data DA12 while the display interface circuit 208 is receiving the sub-file. The graphics processing unit 202 is further arranged to ignore the invalid data of the last sub-file according to the identify data DA12 after all of the at least one sub-file has been received by the display interface circuit 208. Namely, the graphics processing unit 202 is further arranged to ignore 76800 bits of the invalid data of the last sub-file according to the identify data DA12 after all of the at least one sub-file has been received by the display interface circuit 208. Next, the graphics processing unit 202 is arranged to combine the 80000 bits of the valid data of the at least one sub-file received by the buffer 206 to constitute the file C1, and store the file C1 in the storage unit 207 to update the program code.

In one of the exemplary embodiments, the graphics processing unit 202 is arranged to force the display interface circuit 208 to receive the image data D1, the horizontal sync signal, and the vertical sync signal from the system unit 100 according to the display command CM2, and adjust the resolution of the display device 300 according to the identify data DA22 when the display command CM2 is received by the serial peripheral interface circuit 204. Next, the display interface circuit 208 transmits the received image data D1 to a buffer 206. The buffer 206 is arranged to transmit the image data D1 to the graphics processing unit 202 for image processing. The display interface circuit 208 is arranged to process the image data D1 to produce an image data Dr, and transmit the processed image data Dr to the display device 300. The display device displays the image data Dr according to the horizontal sync signal and the vertical sync signal. For example, the identify data DA21 of the display command CM2 is a code arranged to indicate that the image data D1 is used for displaying image. It should be noted that the graphics processing unit 202 is arranged to determine whether the display interface circuit 208 has received all of the at least one sub-file according to the horizontal sync signal, the vertical sync signal, and the identify data DA12 while the display interface circuit 208 is receiving the sub-file. In one of the exemplary embodiments, the system unit 100, the graphics control unit 200, and the display device 300 is implemented in an individual device. In another embodiment, the system unit 100 and the graphics control unit 200 is implemented in the same device. For example, the system unit 100 and the graphics control unit 200 can be implemented in a processing unit and an independent graphics card, respectively, but it is not limited thereto. In some embodiments, the graphics control unit 200 can be implemented in the system unit 100.

Figure 2A:
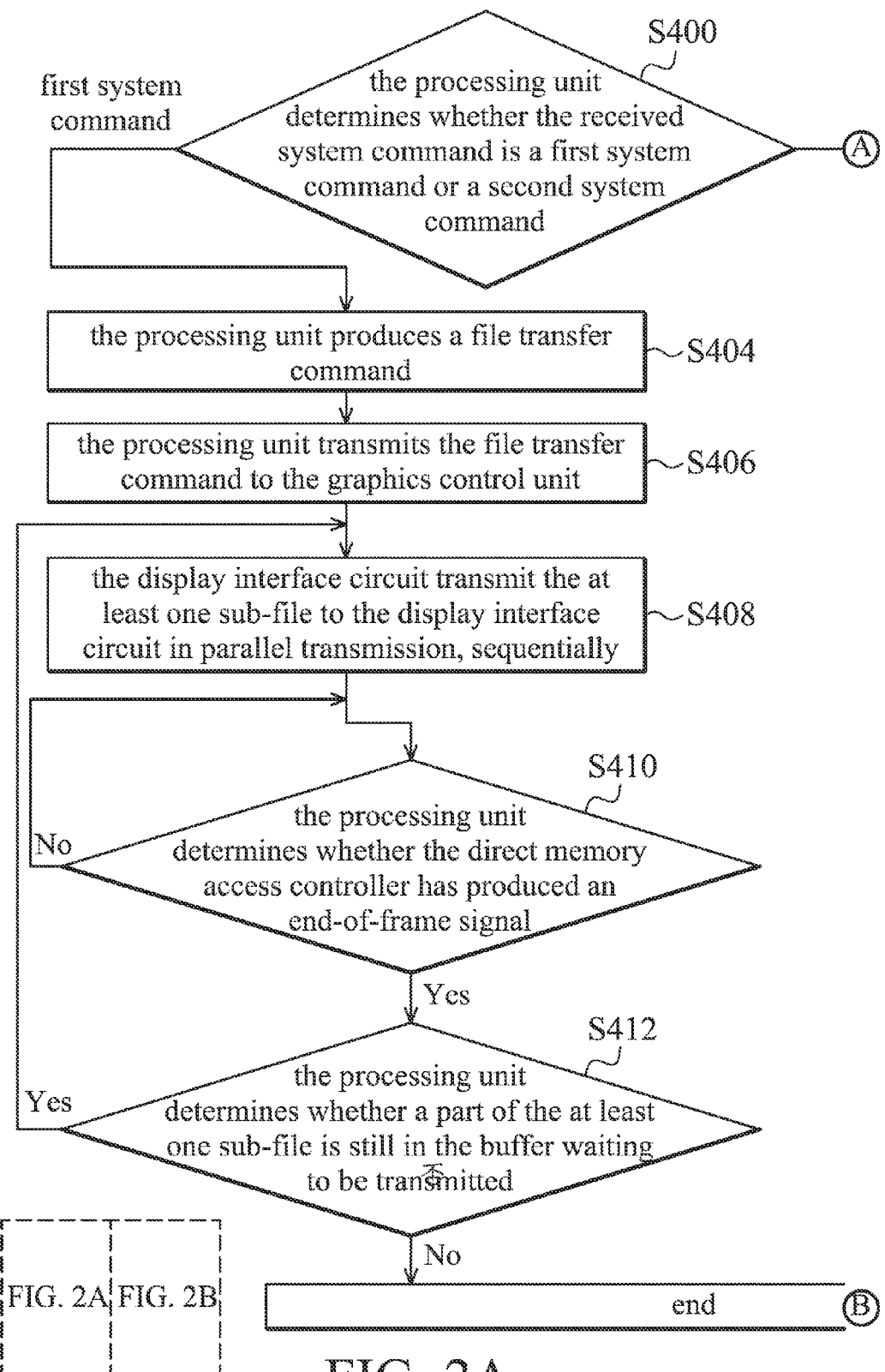
FIGS. 2A and 2B is a flowchart of a data transmission method according to an embodiment according to the exemplary embodiments.
Figure 2B:
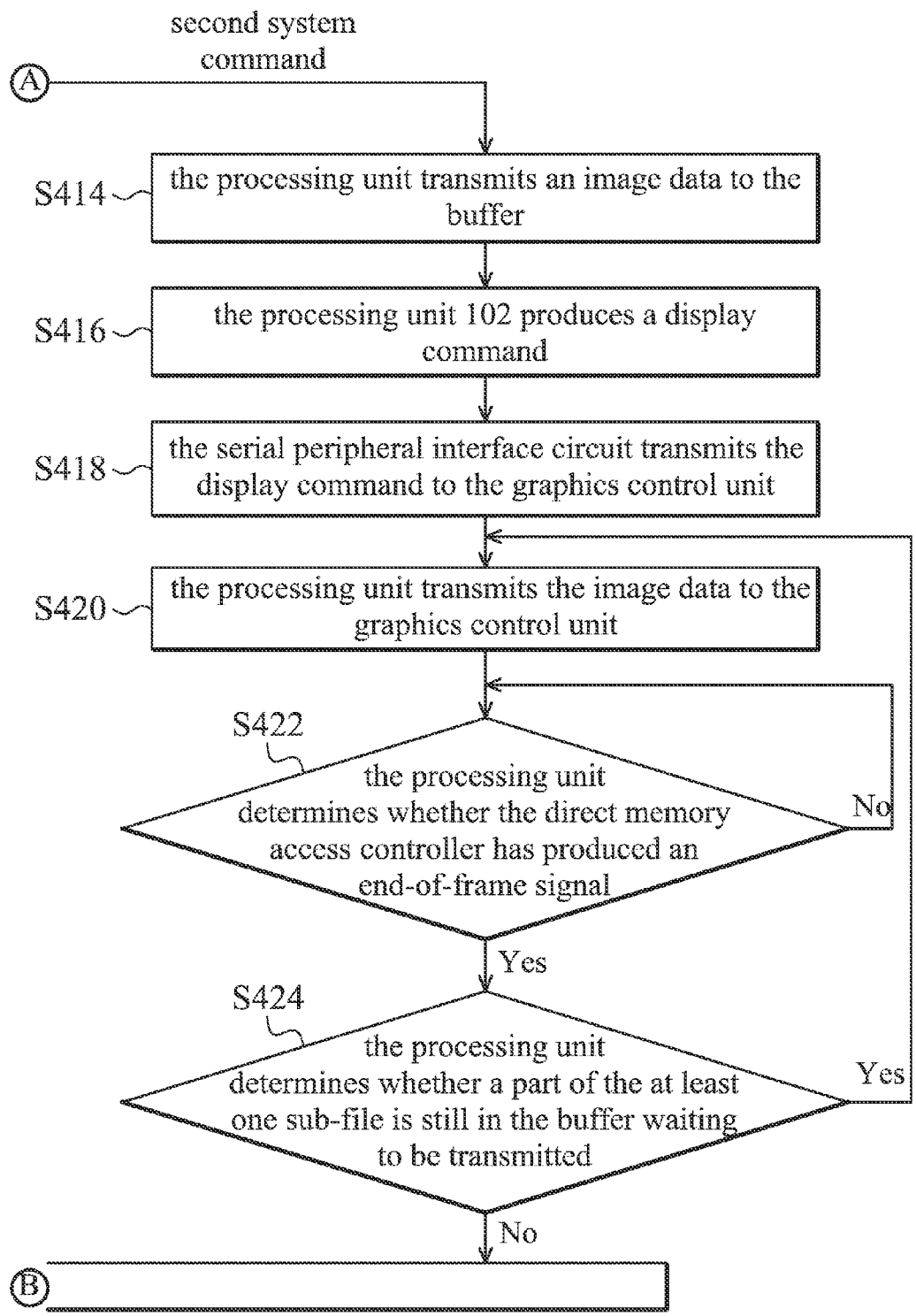

FIGS. 2A and 2B is a flowchart of a data transmission method according to an embodiment of the invention, wherein the data transmission method is applied to the data transmission system 1000 of FIG. 1. The process starts at step S400.

In step S400, the processing unit 102 is arranged to determine whether the received system command is a first system command or a second system command. It should be noted that the first system command indicates updating the program code of the graphics control unit 200, and the second system command indicates displaying image, but it is not limited thereto. The step S404 is performed when the processing unit 102 received the first system command. The step S414 is performed when the processing unit 102 receives the second system command.

In step S404, the processing unit 102 is arranged to determine the length of a file C1, and produce a file transfer command CM1 according to the length and usage of the file C1. Moreover, the processing unit 102 is further arranged to divide the file C1 into at least one sub-file (not shown) according to a system resolution, and transmit the at least one sub-file divided from the file C1 to a buffer 106, wherein the quantity of the data of each of the at least one sub-file is equal to the quantity of a frame having the system resolution. It should be noted that the file C1 is a program code used for updating the program code of the storage unit 207, but it is not limited thereto. The file transfer command CM1 includes the identify data DA11 and the identify data DA12. The identify data DA11 indicates the usage of the file C1. The identify data DA12 indicates the length of the file C1.

Next, in step S406, the processing unit 102 is further arranged to transmit the file transfer command CM1 to the serial peripheral interface circuit 204, and force the serial peripheral interface circuit 104 to transmit the file transfer command CM1 to the graphics control unit 200.

Next, in step S408, the display interface circuit 108 is arranged to transmit the at least one sub-file to the display interface circuit 208 in parallel transmission, sequentially, and transmit a horizontal sync signal and a vertical sync signal corresponding to the at least one sub-file to the graphics control unit 200, wherein the quantity of the data of each of the at least one sub-file is equal to the quantity of a frame having the system resolution. It should be noted that the display interface circuit 108 includes a direct memory access controller 109 (DMA controller), at least 16 data lines data1-dataN, a horizontal sync signal line Hsync, a vertical sync signal line Vsync, and a clock line PCLK. In another embodiment, the number of the data lines data1-dataN can be 24. The direct memory access controller 109 is arranged to force the data lines data1-dataN to transmit the at least one sub-file to the display interface circuit 208 in parallel transmission after being enabled by the processing unit 102, sequentially. Furthermore, the direct memory access controller 109 is further arranged to force the horizontal sync signal line Hsync and the vertical sync signal line Vsync to transmit a horizontal sync signal and a vertical sync signal corresponding to the at least one sub-file to the graphics control unit 200. For example, the display interface circuit 108 can transmit 16 bits of one sub-file by the 16 data lines, simultaneously. Namely, the display interface circuit 108 can transmit 16 bits of a sub-file in parallel transmission, simultaneously. For another example, the display interface circuit 108 can transmit 24 bits of one sub-file by the 24 data lines, simultaneously. Namely, the display interface circuit 108 can transmit 24 bits of a sub-file in parallel transmission, simultaneously.

Next, in step S410, the processing unit 102 is arranged to determine whether the direct memory access controller 109 has produced an end-of-frame signal (EOF). When the direct memory access controller 109 has produced the end-of-frame signal, step S412 is performed; otherwise, the processing unit 102 continues to determine whether the direct memory access controller 109 has produced the end-of-frame signal. It should be noted that the end-of-frame signal indicates that a sub-file has been completely transmitted to the graphics control unit 200.

In step S412, the processing unit 102 is arranged to determine whether a part of the at least one sub-file is still in the buffer 106 waiting to be transmitted. When a part of the at least one sub-file is still in the buffer 106, step S408 is performed, wherein the display interface circuit 108 continues to transmit the sub-file(s). When there is no sub-file in the buffer 106, step S412 is the last step.

In step S414, the processing unit 102 is arranged to transmit an image data D1 to a buffer 106.

Next, in step S416, the processing unit 102 is arranged to produce a display command CM2 according to a resolution and usage of the image data D1, and force the serial peripheral interface circuit 104 to transmit the display command CM2 to the graphics control unit 200. In this embodiment, the display command CM2 includes the identify data DA21 and the identify data DA22. The identify data DA21 is arranged to indicate the usage of the image data D1, and the identify data DA22 is arranged to indicate the resolution of the image data D1. Namely, the identify data DA21 is arranged to indicate displaying image. For example, the identify data DA21 of the display command CM2 is a code arranged to indicate that the image data D1 is used for displaying image, and the identify data DA22 is a code arranged to indicate the resolution of the image data D1.

Next, in step S418, the serial peripheral interface circuit 104 is arranged to transmit the display command CM2 to the graphics control unit 200.

Next, in step S420, the processing unit 102 is arranged to transmit the image data D1 in the buffer 106 to the graphics control unit 200 by the display interface circuit 108. For example, the processing unit 102 is arranged to enable the direct memory access controller 109 of the display interface circuit 108. The direct memory access controller 109 is arranged to force the data lines data1-dataN to transmit the at least one sub-file to the display interface circuit 208 in parallel transmission after being enabled by the processing unit 102, sequentially. Furthermore, the direct memory access controller 109 is further arranged to force the horizontal sync signal line Hsync and the vertical sync signal line Vsync to transmit a horizontal sync signal and a vertical sync signal corresponding to the at least one sub-file to the graphics control unit 200.

Next, in step S422, the processing unit 102 is arranged to determine whether the direct memory access controller 109 has produced an end-of-frame signal (EOF). When the direct memory access controller 109 has produced the end-of-frame signal, step S424 is performed; otherwise, the processing unit 102 continues to determine whether the direct memory access controller 109 has produced the end-of-frame signal. It should be noted that the end-of-frame signal indicates that a sub-file has transmitted to the graphics control unit 200, completely.

Next, in step S424, processing unit 102 is arranged to determine whether a part of the at least one sub-file is still in the buffer 106 waiting to be transmitted. When a part of the at least one sub-file is still in the buffer 106, step S420 is performed, wherein the display interface circuit 108 continuous to transmit the sub-file(s). When there is no sub-file in the buffer 106, step S424 is the last step.

Figure 3:
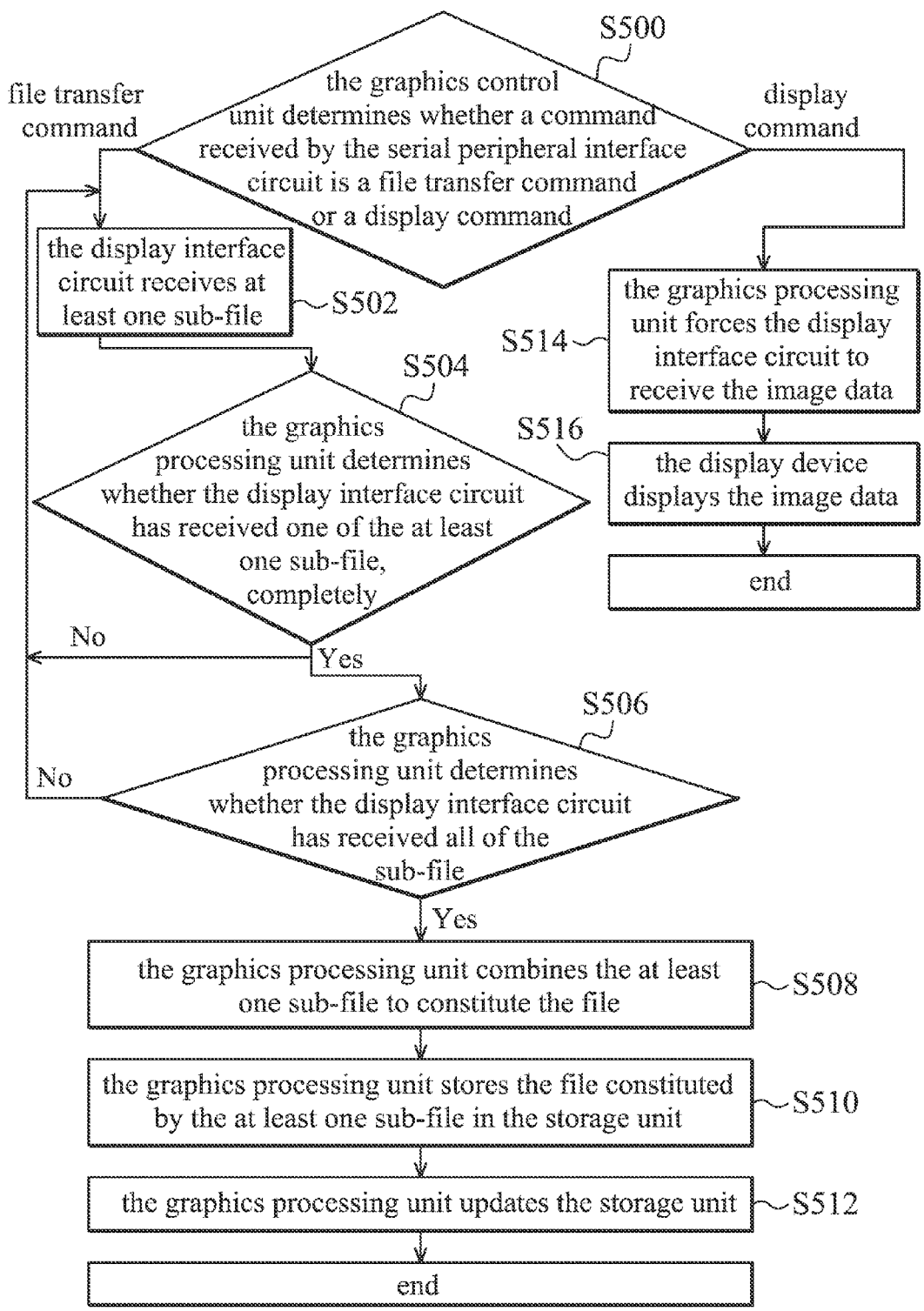
FIG. 3 is a flowchart of another data transmission method according to an embodiment according to the exemplary embodiments.

FIG. 3 is a flowchart of another data transmission method according to an embodiment of the exemplary embodiments, wherein the data transmission method is applied to the data transmission system 1000 of FIG. 1. Step S500 is the first step.

In step S500, the graphics control unit 200 is arranged to determine whether a command received by the serial peripheral interface circuit 204 is a file transfer command CM1 or a display command CM2. It should be noted that the file transfer command CM1 includes the identify data DA11 and the identify data DA12. The identify data DA11 is arranged to indicate the usage of the file C1, and the identify data DA12 is arranged to indicate the length of the file C1. The display command CM2 includes the identify data DA21 and the identify data DA22. The identify data DA21 is arranged to indicate the usage of the image data D1, and the identify data DA22 is arranged to indicate the resolution of the image data D1. When the serial peripheral interface circuit 204 receives the file transfer command CM1, step S502 is performed. When the serial peripheral interface circuit 204 receives the display command CM2, step S514 is performed. When the command received by the serial peripheral interface circuit 204 is not the file transfer command CM1 and the display command CM2, step S500 is the last step.

In step S502, the display interface circuit 208 is arranged to receive at least one sub-file, a horizontal sync signal, and a vertical sync signal. It should be noted that the display interface circuit 208 receives the at least one sub-file in the buffer 206.

Next, in step S504, the graphics processing unit 202 is arranged to determine whether the display interface circuit 208 has completely received one of the at least one sub-file according to the horizontal sync signal and the vertical sync signal. Namely, the graphics processing unit 202 is arranged to determine whether the display interface circuit 208 has completely received data of a frame according to the horizontal sync signal and the vertical sync signal. When the display interface circuit 208 has completely received one of the at least one sub-file, step S506 is performed; otherwise, step S502 is performed, wherein the display interface circuit 20 continues to receive the rest of the sub-file, the horizontal sync signal, and the vertical sync signal.

In step S506, the graphics processing unit 202 is arranged to determine whether the display interface circuit 208 has received all of the at least one sub-file according to the horizontal sync signal, the vertical sync signal, and the identify data DA12. When the graphics processing unit 202 has received all of the at least one sub-file, step S508 is performed; otherwise, step S502 is performed, wherein the display interface circuit 208 continues to receive the rest of the sub-file, the horizontal sync signal, and the vertical sync signal. For example, the graphics processing unit 202 determines that the length of a file is 80000 bits according to the identify data DA12, wherein the graphics processing unit 202 can determine a number of the at least one sub-file according to the resolution of the current frame displayed by the display device 300 and the identify data DA12. Namely, the graphics processing unit 202 can determine a number of the at least one sub-file according to the system resolution and the identify data DA12. For example, the number of the sub-file may be one, or the number of the sub-files may be two. Therefore, the graphics processing unit 202 can determine whether the display interface circuit 208 has received all of the at least one sub-file according to the number of the at least one sub-file.

In step S508, the graphics processing unit 202 is further arranged to ignore the invalid data of the last sub-file according to the identify data DA12, and combine the at least one sub-file with each other to constitute the file C1.

Next, in step S510, the graphics processing unit 202 is arranged to store the file C1' constituted by the at least one sub-file in the storage unit 207.

Next, in step S512, the graphics processing unit 202 is arranged to update the storage unit 207 by the file C1 of the storage unit 207. Step S512 is the last step.

In step S514, the graphics processing unit 202 is arranged to force the display interface circuit 208 to receive the image data D1, the horizontal sync signal, and the vertical sync signal from the system unit 100 according to the display command CM2, and adjust the resolution of the display device 300 according to the identify data DA22.

In step S516, the display device 300 displays the image data D1 according to the horizontal sync signal and the vertical sync signal. For example, the display interface circuit 208 is arranged to transmit the received image data D1 to a buffer 206. The buffer 206 is arranged to transmit the image data D1 to the graphics processing unit 202 for image processing. The display interface circuit 208 processes the image data D1 to produce the image data D1', and transmits the image data D1' to the display device 300. The display device displays the image data D1' according to the horizontal sync signal and the vertical sync signal. Step S516 is the last step.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transmission system, comprising:
   a processing unit, arranged to determine a length of a file, divide the file into a plurality of sub-files according to a system resolution, and produce a file transfer command, wherein quantity of bits of each of the sub-files is equal to quantity of bits of a frame having the system resolution;
   a first serial peripheral interface circuit, arranged to transmit the file transfer command to a second serial peripheral interface circuit; and
   a first display interface circuit, arranged to transmit the sub-files to a second display interface circuit, sequentially.

2. The data transmission system as claimed in claim 1, further comprising:
   the second serial peripheral interface circuit, arranged to receive the file transfer command;
   the second display interface circuit, arranged to receive the sub-files, sequentially; and
   a graphics processing unit, arranged to force the second display interface circuit to receive the sub-files according to the file transfer command received by the second serial peripheral interface circuit, and combine the sub-files to constitute the file.

3. The data transmission system as claimed in claim 2, wherein the file transfer command comprises a first identify data and a second identify data, wherein the first identify data is arranged to indicate usage of the file, and the second identify data is arranged to indicate the length of the file.

4. The data transmission system as claimed in claim 3, wherein the processing unit is arranged to force the first display interface circuit to transmit a horizontal sync signal and a vertical sync signal to the second display interface circuit according to the sub-files, and the graphics processing unit is arranged to determine whether the second display interface circuit has received all of the sub-files according to the horizontal sync signal, the vertical sync signal, and the second identify data.

5. The data transmission system as claimed in claim 3, wherein the graphics processing unit is arranged to ignore invalid data of the sub-files according to the second identify data when combining the sub-files to constitute the file.

6. The data transmission system as claimed in claim 2, further comprising:
   a buffer, arranged to store the sub-files received by the second display interface circuit; and
   a storage unit, arranged to store the file combined by the graphics processing unit.

7. The data transmission system as claimed in claim 6, wherein the file is a program code, and the program code is arranged to update the storage unit.

8. The data transmission system as claimed in claim 2, wherein the first and the second display interface circuit have at least 16 data lines arranged to transmit the sub-files by parallel transmission, sequentially, wherein the first display interface circuit, the first serial peripheral interface circuit, and the processing unit are implemented in a system unit of the data transmission system, the second display interface circuit, the second serial peripheral interface circuit and the graphics processing unit are implemented in a graphics control unit of the data transmission system, and the system unit and the graphics control unit are different devices.

9. A data transmission method, comprising:
   determining a length of a file when receiving a first system command, and producing a file transfer command according to the length and usage of the file;
   dividing the file into a plurality of sub-files according to a system resolution, and transmitting the sub-files to a buffer, wherein quantity of bits of each of the sub-files divided from the file is equal to quantity of bits of a frame of the system resolution;
   transmitting the file transfer command to a second serial peripheral interface circuit by a first serial peripheral interface circuit; and
   transmitting the sub-files to a second display interface circuit by a first display interface circuit in parallel transmission, sequentially.

10. The data transmission method as claimed in claim 9, further comprising transmitting a horizontal sync signal and a vertical sync signal corresponding to the sub-files to the second display interface circuit by the first display interface circuit.

11. The data transmission method as claimed in claim 9, wherein the file is a program code, and the program code is arranged to update a storage unit.

12. The data transmission method as claimed in claim 9, further comprising:
- transmitting an image data to the buffer when receiving a second system command;
- producing a display command according to a resolution and usage of the image data;
- transmitting the display command to the second serial peripheral interface circuit by the first serial peripheral interface circuit; and
- transmitting the image data to the second display interface circuit, directly, by the first display interface circuit.

13. A data reception method, comprising:
- determining whether a command received by a first serial peripheral interface circuit is a file transfer command whether the command received by a first serial peripheral interface circuit is a display command, wherein the file transfer command comprises a first identify data and a second identify data, and the first identify data is arranged to indicate usage of a file, and the second identify data is arranged to indicate the length of the file;
- receiving a plurality of sub-files by a first display interface circuit in parallel transmission, sequentially, when receiving the file transfer command; and
- combining the sub-files to constitute the file according to the file transfer command.

14. The data reception method as claimed in claim 13, further comprising:
- receiving a horizontal sync signal and a vertical sync signal by the first display interface circuit; and
- determining whether the first display interface circuit has received all of the sub-files according to the horizontal sync signal, the vertical sync signal, and the second identify data.

15. The data reception method as claimed in claim 13, wherein step of combining the sub-files to constitute the file according to the file transfer command further comprises ignoring invalid data of the sub-files according to the second identify data.

16. The data reception method as claimed in claim 13, further comprising:
- storing the sub-files received by the first display interface circuit in a buffer; and
- storing the combined file in a storage unit.

17. The data reception method as claimed in claim 16, further comprising:
- receiving the image data, directly, by the first display interface circuit when receiving the display command, wherein the display command comprises a third identify data and a fourth identify data, the third identify data is arranged to indicate usage of an image data, and the fourth identify data is arranged to indicate resolution of the image data.

18. The data reception method as claimed in claim 16, wherein the file is a program code, and the program code is arranged to update the storage unit.

19. The data reception method as claimed in claim 13, wherein the first display interface circuit has at least 16 data lines arranged to transmit the sub-files by parallel transmission.

* * * * *